United States Patent
Nakajima et al.

(10) Patent No.: US 7,946,767 B2
(45) Date of Patent: May 24, 2011

(54) HYDROSTATIC BEARING AND STAGE APPARATUS

(75) Inventors: Ryuta Nakajima, Yokosuka (JP); Tsuyoshi Nomoto, Kurashiki (JP); Takuya Hosobata, Yokosuka (JP)

(73) Assignee: Sumitomo Heavy Industries, Ltd, Tokyo (JP)

( * ) Notice: Subject to any disclaimer, the term of this patent is extended or adjusted under 35 U.S.C. 154(b) by 459 days.

(21) Appl. No.: 12/168,235

(22) Filed: Jul. 7, 2008

(65) Prior Publication Data
US 2009/0016651 A1    Jan. 15, 2009

(30) Foreign Application Priority Data
Jul. 11, 2007 (JP) .................. 2007-182600

(51) Int. Cl.
*F16C 32/06* (2006.01)
(52) U.S. Cl. ........................................................ 384/12
(58) Field of Classification Search ................ 384/9, 12, 384/13, 100
See application file for complete search history.

(56) References Cited

U.S. PATENT DOCUMENTS

| | | | | |
|---|---|---|---|---|
| 4,558,909 A * | 12/1985 | Stauber | ............ | 384/12 |
| 4,719,705 A * | 1/1988 | Laganza et al. | ........... | 384/12 |
| 5,562,396 A * | 10/1996 | Yamazaki et al. | ............. | 384/12 |
| 5,967,666 A * | 10/1999 | Johnson | .......... | 384/12 |
| 7,232,257 B2 * | 6/2007 | Sai | ........ | 384/12 |
| 7,284,906 B2 * | 10/2007 | Emoto et al. | ............ | 384/12 |
| 2003/0113043 A1 * | 6/2003 | Uchimi | ............ | 384/12 |
| 2005/0129339 A1 * | 6/2005 | Sai et al. | ........... | 384/12 |
| 2007/0014494 A1 * | 1/2007 | Wardman et al. | ............ | 384/12 |

FOREIGN PATENT DOCUMENTS

| | | |
|---|---|---|
| JP | 2000-155186 | 6/2000 |
| JP | 2001-143984 | 5/2001 |
| JP | 2003-314549 | 11/2003 |

\* cited by examiner

*Primary Examiner* — Thomas R Hannon
(74) *Attorney, Agent, or Firm* — IPUSA, PLLC

(57) ABSTRACT

A hydrostatic bearing configured to slide along a sliding surface of a structural body in a non-contact manner, the hydrostatic bearing includes a jetting part having a jetting surface configured to jet air onto the sliding surface; and a suction part having a suction surface configured to suction the air jetted from the jetting surface onto the sliding surface. The suction surface is situated at one of an internal circumferential side and an external circumferential side of the jetting part and is positioned higher than a lower end of the jetting part.

4 Claims, 5 Drawing Sheets

HYDROSTATIC BEARING AND STAGE APPARATUS

BACKGROUND OF THE INVENTION

1. Field of the Invention

The present invention generally relates to hydrostatic bearings and stage apparatuses.

More specifically, the present invention relates to a hydrostatic bearing for sliding a slider on a sliding surface of an X-Y stage in a non-contact stage and a stage apparatus having the hydrostatic bearing.

2. Description of the Related Art

As a hydrostatic bearing for sliding a slider on a sliding surface of an X-Y stage in a non-contact state, techniques discussed in Japanese Laid-Open Patent Application Publication No. 2000-155186 have been suggested. The hydrostatic bearing discussed in this publication is provided at a lower end part of a slider of the X-Y stage.

The hydrostatic bearing receives a force toward a guide surface (sliding surface) of a base (structural body) due to the weight of the slider and a force in a direction where the bearing is separated from the guide surface due to application of pressure of air jetted to the guide surface of the base. While the forces from both sides in the vertical direction are applied to the hydrostatic bearing, the hydrostatic bearing moves along the guide surface in a non-contact manner.

In the hydrostatic bearing which floats above the guide surface due to jetting of the air, air is jetted toward particles situated in minute holes formed in the base or particles adhered on the surface of the base which may fly high and scatter in the vicinity of the apparatus.

Especially, in a case where a semiconductor substrate or the like is mounted on the base of the apparatus, scattering particles may be adhered on the semiconductor substrate.

SUMMARY OF THE INVENTION

Accordingly, embodiments of the present invention may provide a novel and useful hydrostatic bearing and a stage apparatus solving one or more of the problems discussed above.

More specifically, the embodiments of the present invention may provide a hydrostatic bearing and a stage apparatus whereby it is possible to prevent particles from flying in the vicinity of the apparatus.

One aspect of the embodiments of the present invention may be to provide a hydrostatic bearing configured to slide along a sliding surface of a structural body in a non-contact manner, the hydrostatic bearing including a jetting part having a jetting surface configured to jet air onto the sliding surface; and a suction part having a suction surface configured to suction the air jetted from the jetting surface onto the sliding surface, wherein the suction surface is situated at one of an internal circumferential side and an external circumferential side of the jetting part and is positioned higher than a lower end of the jetting part.

Another aspect of the embodiments of the present invention may be to provide a stage apparatus, including a stage; a first moving body configured to move above the stage in a first direction; a second moving body configured to move along the first moving body in a second direction perpendicular to the first direction; and a hydrostatic bearing provided at a lower part of at least one of the first moving body and the second moving body, the hydrostatic bearing being configured to slide along a sliding surface of the stage in a non-contact manner, wherein the hydrostatic bearing includes a jetting part having a jetting surface configured to jet air onto the sliding surface, and a suction part having a suction surface configured to suction the air jetted from the jetting surface to the sliding surface, and wherein the suction surface is situated at one of an internal circumferential side and an external circumferential side of the jetting part and is positioned higher than a lower end of the jetting part.

According to the embodiments of the present invention, it is possible to provide a hydrostatic bearing and a stage apparatus whereby it is possible to prevent particles from flying in the vicinity of the apparatus.

Other objects, features, and advantages of the present invention will become more apparent from the following detailed description when read in conjunction with the accompanying drawings.

DETAILED DESCRIPTION OF THE PREFERRED EMBODIMENTS

A description is given below, with reference to FIG. 1 through FIG. 5 of embodiments of the present invention. In the following explanation, a tilted stage is discussed as an example.

First Embodiment

Figure 1:
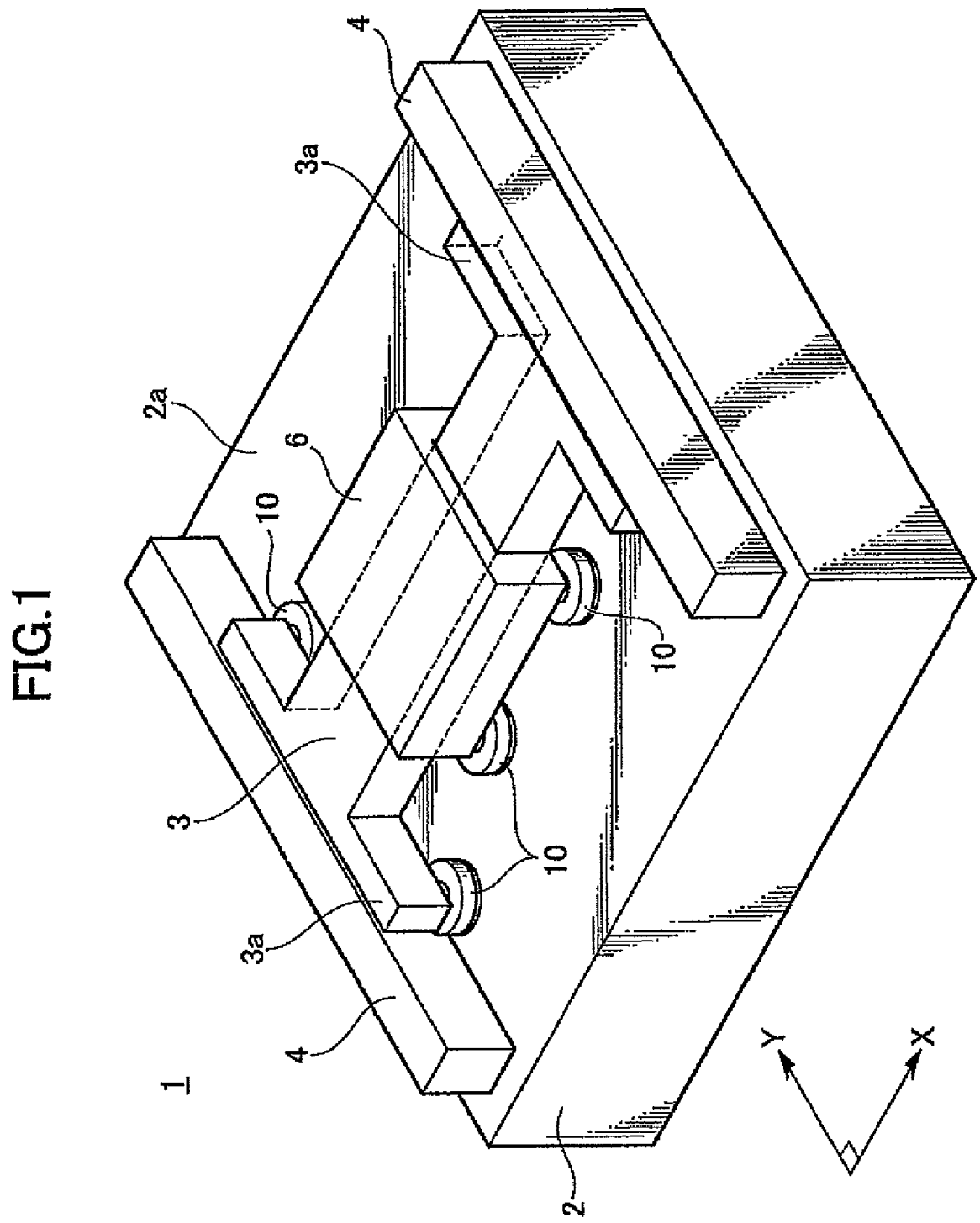
FIG. 1 is a perspective view of an X-Y stage apparatus where a hydrostatic bearing of a first embodiment of the present invention is applied.

FIG. 1 is a perspective view of an X-Y state apparatus 1 where hydrostatic bearings 10 of a first embodiment of the present invention are applied.

As shown in FIG. 1, the X-Y stage apparatus 1 where the hydrostatic bearings 10 are applied includes a stage (structural body) 2, a first moving body 3, rail parts 4, and a second moving body 6.

The stage 2 has a sliding surface 2a for the hydrostatic bearings 10. The first moving body 3 is configured to move in a Y-axial direction (first direction) above the stage 2. The extended rail parts 4 are provided at both ends in X-axial directions on the stage 2 and configured to guide the movement of the first moving body 3. The second moving body 6 is configured to move along the first moving body 3 in the X-axial direction (second direction).

Slider parts 3a are formed at both ends of the first moving body 3 of the X-Y stage apparatus 1. The slider parts 3a move along the rail parts 4. The hydrostatic bearings 10 are provided at lower end parts of the slider parts a. In addition, the hydrostatic bearings 10 are also provided at the lower end parts of the second moving body 6. As clearly shown in FIG. 1, the X-axial direction and the Y-axial direction cross each other on a horizontal surface.

The hydrostatic bearing 10 receives a force downward (in a lower direction) due to weights of the slider parts 3a and the second moving body 6. In addition, the hydrostatic bearing 10 receives a force upward (in an upper direction) due to application of pressure of air jetted onto the sliding surface 2a of the stage 2.

With this structure, while the forces from both sides in the vertical directions are applied to the hydrostatic bearing 10, the hydrostatic bearing 10 floats above the sliding surface 2a. In addition, based on the movement of the first moving body 3 or the second moving body 6, the hydrostatic bearing 10 moves over the sliding surface 2a in a non-contact manner.

Figure 2:
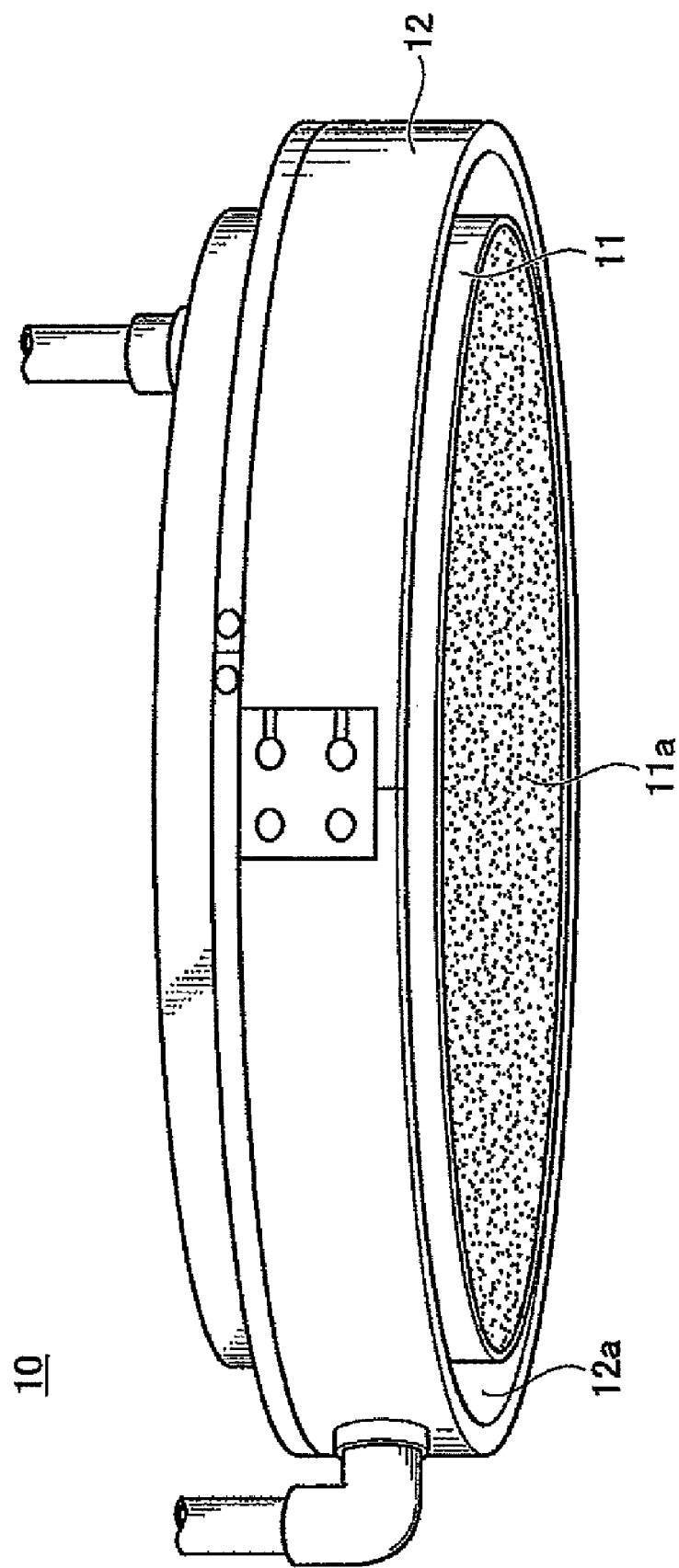
FIG. 2 is a perspective view of the hydrostatic bearing of the first embodiment of the present invention.

FIG. 2 is a perspective view of the hydrostatic bearing 10 of the first embodiment of the present invention.

As shown in FIG. 2, the hydrostatic bearing 10 includes a jetting part 11, a jetting surface 11a, a suction part 12, and a suction surface 12a.

The jetting part 11 is configured to jet air onto the sliding surface 2a. The circular-shaped jetting surface 11a is provided at a lower surface side of the jetting part 11. The suction part 12 is provided at an external circumferential side of the jetting part 11. The suction part 12a is configured to suction and receive the air jetted from the jetting part 11 to the sliding surface 2a and particles from the stage 2 shown in FIG. 1. The ring-shaped suction surface 12a is provided at the lower surface side of the suction part 12 and surrounds the jetting part 11.

Figure 3:
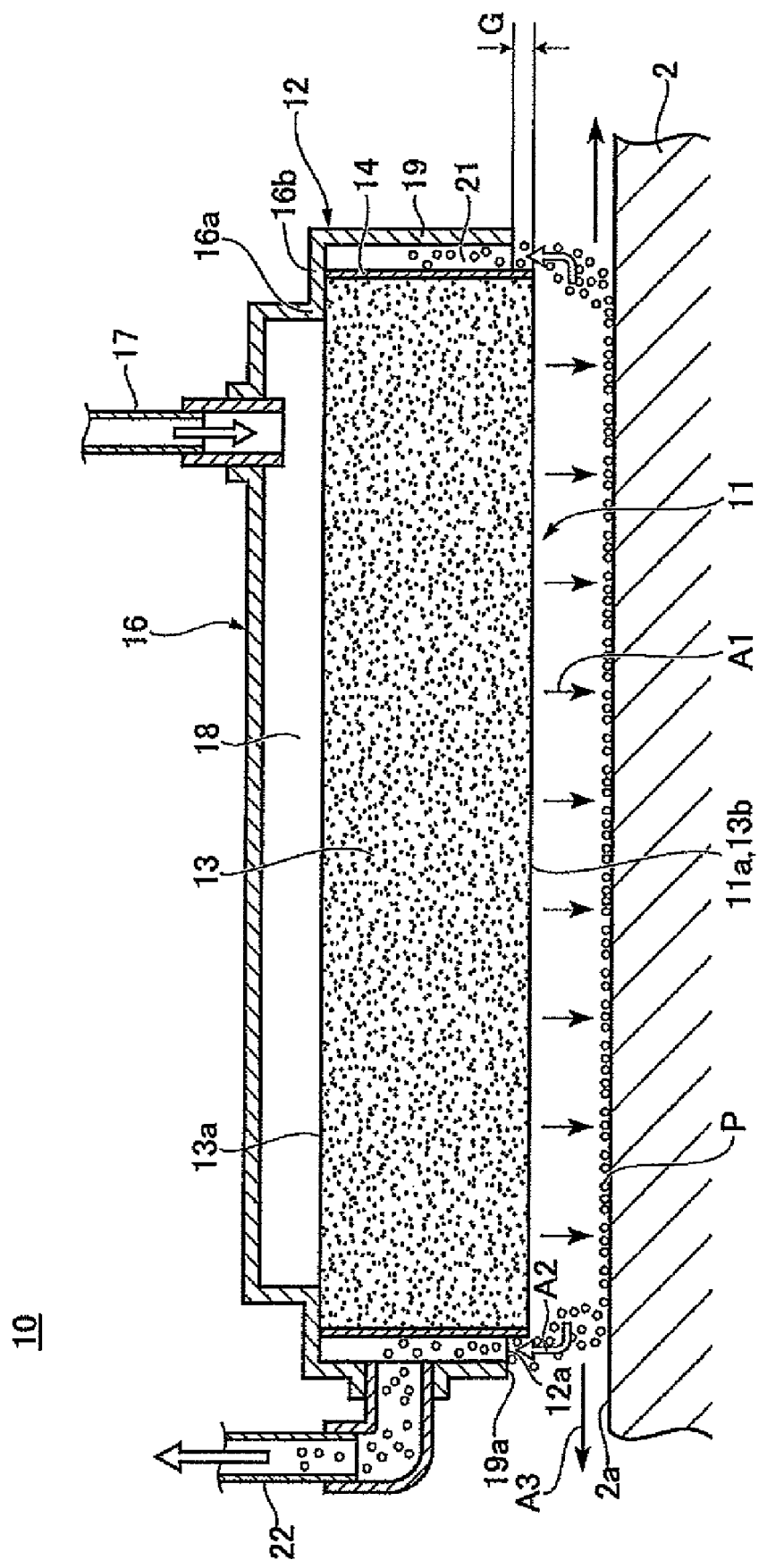
FIG. 3 is a horizontal cross-sectional view of the hydrostatic bearing shown in FIG. 2.

FIG. 3 is a horizontal cross-sectional view of the hydrostatic bearing 10 shown in FIG. 2.

As shown in FIG. 3, the jetting part 11 includes a columnar-shaped sintering member 13, an external circumferential wall part 14, an upper wall part 16, and an air nozzle 17.

Minute holes are formed inside the sintering member 13 by sintering a carbon member. The external circumferential wall part 14 is adhered to the external circumferential surface of the sintering member 13 so as to surround the sintering member 13 and prevent leakage of the air. The upper wall part 16 is provided at an upper surface 13a side of the sintering member 13 so as to prevent leakage of the air.

The air nozzle 17 is provided at the upper wall part 16 so as to supply air from the upper surface 13a side to the sintering member 13. A control valve (not shown in FIG. 3) is provided at the air nozzle 17 and the jetting amount of the air can be controlled by the control valve.

A bottom surface 13b of the sintering member 13 is situated so as to face the sliding surface 2a. The bottom surface 13b works as the jetting surface 11a of the hydrostatic bearing 10. A gap is formed between the jetting surface 11a and the sliding surface 2a.

The upper wall part 16 has a cup-shaped and columnar configuration. A bottom surface of the upper wall part 16 is formed as an opening part and comes in contact with the upper surface 13a of the sintering member 13. With this structure, a space 18 is formed between the sintering member 13 and the upper wall part 16.

In addition, a ring-shaped step part 16b which extends in an outside direction is provided at a lower end part 16a of the upper wall part 16. The step part 16b closely contacts edge parts of the entire circumference of the upper surface 13a of the sintering member 13.

The suction part 12 includes a cylindrical-shaped external circumferential wall part 19, a suction space 21, and an air nozzle 22.

The external circumferential wall part 19 extends from the edge part of the external circumference of the wall part 16b of the upper wall part 16 downward. The suction space 21 is formed by being surrounded by the external circumferential wall part 19, the external circumferential wall part 14, and the step part 16b.

The air nozzle 22 is provided at the circumference wall part 19 and configured to suction the air in the suction space 21. A control valve (not shown in FIG. 3) is provided at the air nozzle 22 and the suction amount of the air can be controlled by the control valve.

The external circumferential wall part 19 extends to an upper side of the jetting surface 11a. With this structure, the suction surface 12a formed between the lower edge part 19a of the external circumferential wall part 19 and the external circumferential wall part 14 is positioned higher than a lower end of the jetting part 11a. A gap G is formed between the suction surface 12a and the jetting surface 11a.

Next, operations of the hydrostatic bearing 10 are discussed.

First, the air is blown from the air nozzle 17 into the space 18 so that the air is supplied to the sintering member 13 and passes through the minute holes of the sintering member 13. As a result of this, the air is jetted from the jetting surface 11a as indicated by arrows A1. The jetting amount of the air can be controlled by the control valve (not shown in FIG. 3) provided at the air nozzle 17.

At this time, the air is blown toward particles P situated in the minute holes formed in the surface of the stage 2 and adhered to the surface of the stage. As a result of this, the particles P move to an external circumferential side of the jetting surface 11a based on the movement of the air.

By sectioning the air in the suction space 21 with the air nozzle 22, a part of the air is suctioned from the suction surface 12a as indicated by an arrow A2 in FIG. 3. In addition, the particles P are also suctioned via the suction surface 12a together with the air indicated by the arrow A2 and received. The suction amount at this time can be controlled by the control valve provided at the air nozzle 22.

As discussed above, the suction surface 12a formed between the lower edge part 19a of the external circumferential wall part 19 and the external circumferential wall part 14 is positioned higher than a lower end of the jetting surface 11a. Accordingly, not all of the air indicated by the arrow A1 is removed via the suction surface 12a and a part of the air indicated by an arrow A3 flows to the external circumferential side from the suction surface 12a.

As a result of this, air pressure acts between the hydrostatic bearing 10 and the sliding surface 2a so that the hydrostatic bearing 10 floats above the sliding surface 2a.

Thus, even if the air is jetted from the jetting surface 11a to the sliding surface 2a as indicated by the arrows A1 so that the hydrostatic bearing 10 floats above the sliding surface 2a and the air is blown toward particles P situated in the minute holes formed in the sliding surface 2a of the stage 2 and adhered to the surface of the stage, the air indicated by the arrows A2 which is part of the blown air indicated by the arrows A1 is suctioned and received with the particles P via the suction surface 12a situated at the external circumferential side of the jetting part 11.

In addition, as discussed above, the suction surface 12a formed between the lower edge part 19a of the external circumferential wall part 19 and the external circumferential wall part 14 is positioned higher than a lower end of the jetting part 11a. Accordingly, it is possible to easily achieve a balance between the suction of the particles P and jetting of the air.

Because of this, while the hydrostatic bearing 10 floats above the sliding surface 2a in a non-contact manner, it is possible to trap the particles scattering in the vicinity of the stage apparatus 1. In addition, it is possible to trap particles in the air other than the particles 9 flying due to jetting of the air.

Furthermore, since the suction surface 12a is provided along an entire external circumference of the jetting part 11, even if the air is blown toward the particles P as indicated by the arrows A1, a part of the air indicated by the arrows A1, namely the air indicated by the arrows A2 is suctioned with the particles P via the suction surface 12a situated at the external circumferential side of the jetting surface 11a and received. As a result of this, the particles P can be suctioned and removed before the particles P scatter in the vicinity of the stage apparatus 1. In addition, since the suction surface 12a is situated along the entire external circumference of the jetting part 11, it is possible to securely receive the particles P without their escaping.

Second Embodiment

Figure 4:
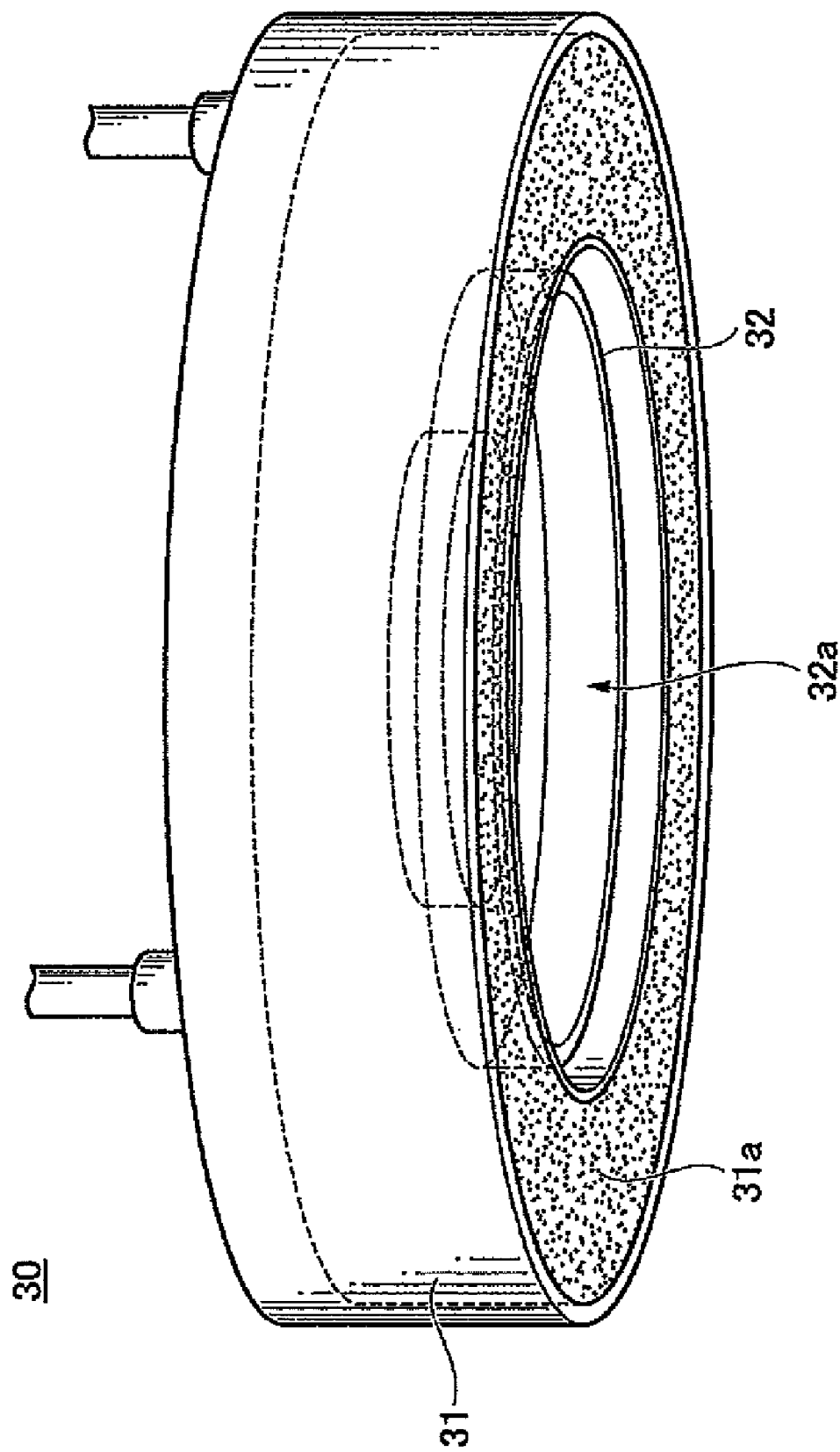
FIG. 4 is a perspective view of the hydrostatic bearing of a second embodiment of the present invention.

FIG. 4 is a perspective view of a hydrostatic bearing 30 of a second embodiment of the present invention As shown in FIG. 4, the hydrostatic bearing 30 includes a jetting part 31, a jetting surface 31a, a suction part 32, and a suction surface 32a.

The jetting surface 31 is configured to let air to the sliding surface 2a. The circular-shaped jetting surface 31a is provided at a lower surface side of the jetting part 31. The suction part 32 is provided at an internal circumferential side of the jetting part 31. The suction part 32 is configured to suction and receive the air jetted from the jetting part 31 to the sliding surface 2a and particles in the stage 2 shown in FIG. 1. The ring-shaped suction surface 32a is provided at the lower surface side of the suction part 32.

Figure 5:
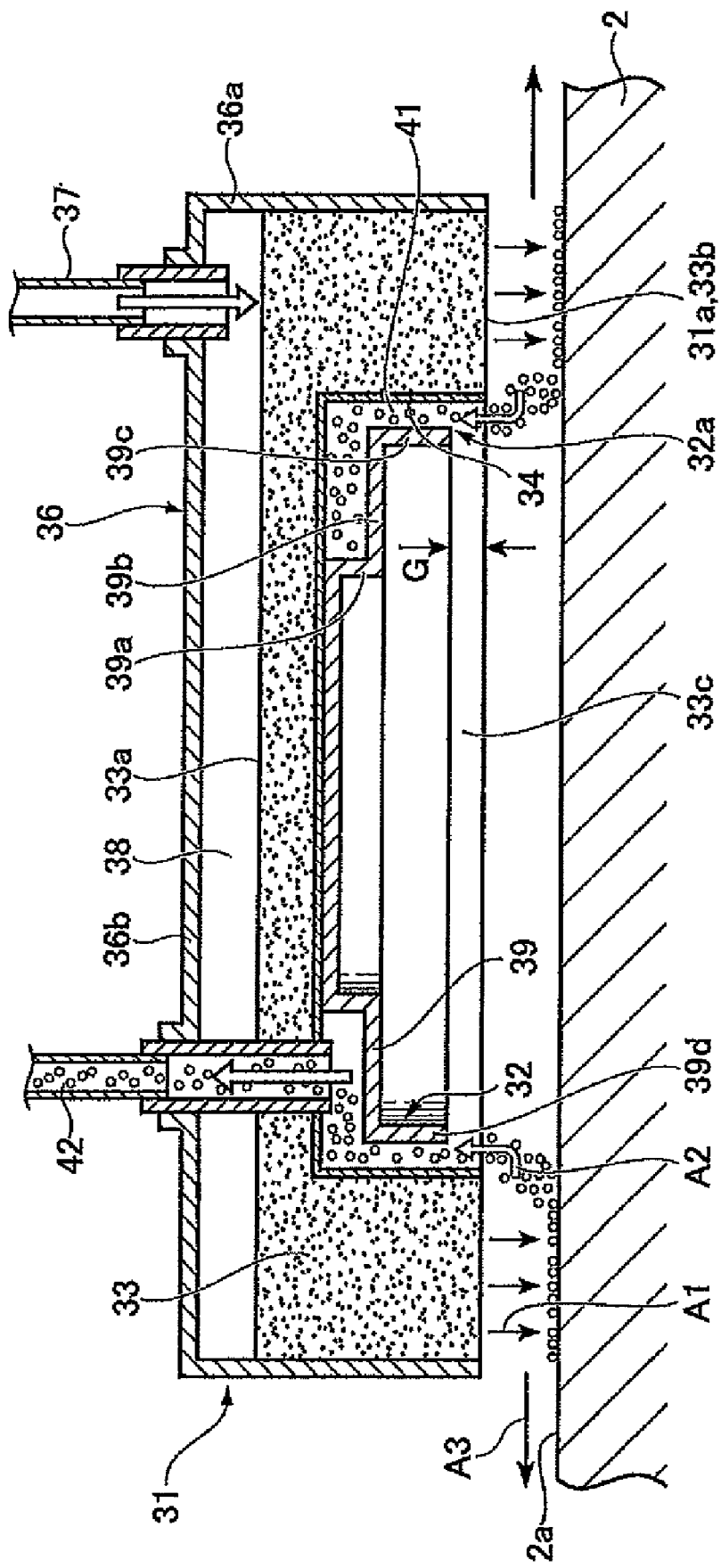
FIG. 5 is a horizontally cross-sectional view of the hydrostatic bearing shown in FIG. 4.

FIG. 5 is a horizontal cross-sectional view of the hydrostatic bearing 30 shown in FIG. 4.

As shown in FIG. 5, the jetting part 31 includes a columnar-shaped sintering member 33, an internal wall part 34, an external wall part 36, and an air nozzle 37.

Minute holes are formed inside the sintering member 33 by sintering a carbon material. The internal wall part 34 is adhered to the internal circumferential surface and the upper surface of an internal space 33c of the sintering member 33 so as to prevent leakage of the air. The external wall part 36 surrounds the sintering member 33 so as to prevent leakage of the air.

The air nozzle 37 is provided at the external wall part 36 so as to supply air from an upper surface 33a side to the sintering member 33. A control valve (not shown in FIG. 5) is provided at the air nozzle 37 and the jetting amount of the air can be controlled by the control valve.

A bottom surface 33b of the sintering member 33 is situated so as to face the sliding surface 2a. The bottom surface 33b works as the jetting surface 31a of the hydrostatic bearing 30. A gap is formed between the jetting surface 31a and the sliding surface 2a.

The external wall part 36 has an external circumference wall part 36a and an upper surface wall part 36b. The external wall part 36 is adhered to the external circumferential surface of the sintering member 33. An upper end part of the external circumference wall part 36a extends higher than the upper surface 33a. The upper surface wall part 36b seals the upper end part of the external circumference wall part 36a so that an internal space 38 is formed by the upper surface 33a of the sintering member 33, the external circumference wall part 36a, and the upper surface wall part 36b.

The suction part 32 includes a partition part 39, a suction space 41, and an air nozzle 42. The partition part 39 is provided in the internal space 33c. The suction space 41 is formed by sandwiching the internal wall part 34 and the partition part 39.

The air nozzle 42 pierces the external wall part 36 and the sintering member 33 and is provided at the internal wall part 34. The air nozzle 42 is configured to suction the air in the suction space 41. A control valve (not shown in FIG. 5) is provided at the air nozzle 42 and the suction amount of the air can be controlled by the control valve.

The partition part 39 includes a cylindrical-shaped part 39a, a ring-shaped step part 39b, and a cylindrical-shaped part 39c. The cylindrical-shaped part 39a is formed downward from the upper wall part 34a of the internal wall part 34. The step part 39b extends in a diameter direction from the lower end part of the cylindrical-shaped part 39a. The cylindrical-shaped part 39c is formed downward from the end part of the external circumferential side of the step part 39b.

In addition, the cylindrical-shaped part 39c extends to an upper side of the jetting surface 31a. With this structure, the suction surface 32a formed between the lower end part 39d of the cylindrical-shaped part 39c and the internal wall part 34 is positioned higher than a lower end of the jetting part 31a. A gap G is formed between the suction surface 32a and the jetting surface 31a.

Next, operations of the hydrostatic bearing 30 are discussed.

First, the air is blown from the air nozzle 37 into the internal space 38 so that the air is supplied to the sintering member 33 and passes through the minute holes of the sintering member 33. As a result of this, the air is jetted from the jetting surface 31a as indicated by arrows A1. The jetting amount of the air can be controlled by the control valve (not shown in FIG. 5) provided at the air nozzle 37.

In addition, by auctioning the air in the suction space 41 from the air nozzle 42, the air indicated by the arrows A2 is auctioned from the suction surface 32a. At this time, the air is blown toward particles P situated in the minute holes formed in the surface of the stage 2 and adhered to the surface of the stage 2. As a result of this, the particles P move to the suction surface 32a based on movement of the air indicated by the arrows A2. The suction amount at this time can be controlled by the control valve provided at the air nozzle 42.

As discussed above, the suction surface 32a is positioned higher than a lower end of the jetting part 31a. Accordingly, not all of the air indicated by the arrows A1 is suctioned by the suction surface 32a and a part of the air indicated by arrow A3 flows to the external circumferential side from the jetting surface 31a.

As a result of this, the air pressure acts between the hydrostatic bearing 30 and the sliding surface 2a so that the hydrostatic bearing 30 floats above the sliding surface 2a.

Furthermore, since the suction surface 32a is provided along an entire internal circumference of the jetting part 31, even if the air is blown toward the particles P as indicated by the arrows A1 by jetting the air from the jetting surface 31a to the sliding surface 2a, a part of the air indicated by the arrows A1, namely the air indicated by the arrows A2 is suctioned with the particles P via the suction surface 32a situated at the internal circumferential side of the jetting part 31 and received.

As a result of this, the particles P are received so as to not flow to the external circumferential side of the jetting surface 31a. Hence, it is possible to reduce the number of the particles on the external circumferential side of the jetting surface 31a.

According to the embodiments of the present invention, it is possible to provide a hydrostatic bearing configured to slide along a sliding surface of a structural body in a non-contact manner, the hydrostatic bearing including a jetting part having a jetting surface configured to jet air onto the sliding surface; and a suction part having a suction surface configured to suction the air jetted from the jetting surface onto the sliding surface, wherein the suction surface is situated at one of an internal circumferential side and an external circumferential side of the jetting part and is positioned higher than a lower end of the jetting part.

It is also possible to provide a stage apparatus, including a stage; a first moving body configured to move above the stage in a first direction; a second moving body configured to move along the first moving body in a second direction perpendicular to the first direction; and a hydrostatic bearing provided at a lower part of at least one of the first moving body and the second moving body, the hydrostatic bearing being configured to slide along a sliding surface of the stage in a non-contact manner, wherein the hydrostatic bearing includes a jetting part having a jetting surface configured to jet air onto the sliding surface, and a suction part having a suction surface configured to suction the air jetted from the jetting surface to the sliding surface, and wherein the suction surface is situated at one of an internal circumferential side and an external circumferential side of the jetting part and is positioned higher than a lower end of the jetting part.

Even if the air is jetted from the jetting surface to the sliding surface so that the hydrostatic bearing floats above the sliding surface and the air is blown toward particles situated in the minute holes formed in the surface of the stage and adhered to the surface of the stage, part of the blown air is suctioned and received with the particles via the suction surface situated at the internal or external circumferential side of the jetting part.

In addition, as discussed above, the suction surface is positioned higher than a lower end of the jetting part. Accordingly, it is possible to easily balance the suction of the particles and jetting of the air. Because of this, while the hydrostatic bearing floats above the sliding surface in a non-contact manner, it is possible to securely trap the particles scattering toward the vicinity of the stage apparatus.

The suction surface may be situated at the external circumference side of the jetting part, along an entire external circumference of the jetting part.

Furthermore, since the suction surface is provided along an entire external circumference of the jetting part, even if the air is blown toward the particles by jetting the air from the jetting surface to the sliding surface, a part of the blown is suctioned with the particles via the suction surface situated at the external circumferential side of the jetting part and received. As a result of this, the particles can be received before the particles scatter in the vicinity of the stage apparatus. In addition, since the suction surface is situated along the entire external circumference of the jetting part, it is possible to securely receive the particles without their leaking.

The suction surface may be situated at the internal circumference side of the jetting part, along an entire internal circumference of the jetting part.

Since the suction surface is provided at the internal circumference side of the jetting part, even it the air is blown toward the particles by jetting the air from the jetting surface to the sliding surface, a part of the blown air is suctioned with the particles via the suction surface situated at the internal circumferential side of the jetting part and received.

As a result of this, the particles can be received so as to not flow to the external circumferential side of the jetting surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

For example, in the above-discussed embodiments, the hydrostatic bearing has a circular-shaped configuration. However, the present invention is not limited to this. The hydrostatic bearing may also have a rectangular-shaped configuration.

In addition, in the above-discussed embodiments, the sintering member is made by sintering carbon materials. However, the present invention is not limited this. The sintering member may also be made by sintering metal materials.

Furthermore, in the above-discussed embodiments, the suction surface is provided along an entire external or internal circumference of the jetting surface. However, the present invention is not limited this. The suction surface may also be provided at a part of the entire external or internal circumference of the jetting surface.

This patent application is based on Japanese Priority Patent Application No. 2007-182600 filed on Jul. 11, 2007, the entire contents of which are hereby incorporated herein by reference.

What is claimed is:

1. A hydrostatic bearing configured to slide along a sliding surface of a structural body in a non-contact manner, the hydrostatic bearing comprising:
 a jetting part having a jetting surface configured to jet air onto the sliding surface; and
 a suction part having a suction surface configured to suction the air jetted from the jetting surface onto the sliding surface,
 wherein the jetting part includes
  a porous member having holes formed therein,
  a first external circumferential wall part disposed to contact and surround an external circumferential surface of the porous member to prevent leakage of the air from the external circumferential surface of the porous member, and
  an upper wall part including a contacting part that is in contact with an edge along an entire circumference of an upper surface of the porous member and forming a space for supplying the air to the porous member;
 wherein the suction part includes
  a second external circumferential wall part surrounding an external circumferential surface of the first external circumferential wall part,
  a suction space formed between the first external circumferential wall part and the second external circumferential wall part, and
  a suction surface formed between a lower edge of the second external circumferential wall part and the first external circumferential wall part and positioned higher than a lower end of the jetting part;
 wherein the first external circumferential wall part and the second external circumferential wall part are formed as separate parts.

2. A hydrostatic bearing configured to slide along a sliding surface of a structural body in a non-contact manner, the hydrostatic bearing comprising:
 a jetting part having a jetting surface configured to jet air onto the sliding surface; and
 a suction part having a suction surface configured to suction the air jetted from the jetting surface onto the sliding surface,
 wherein the jetting part includes
  a porous member having holes formed therein,
  a first external circumferential wall part disposed to contact and surround an external circumferential surface of the porous member to prevent leakage of the air from the external circumferential surface of the porous member, and an upper wall part including a contacting part that is in contact with an edge along an entire circumference of an upper surface of the porous member and forming a space for supplying the air to the porous member;

wherein the suction part includes a second external circumferential wall part surrounding an external circumferential surface of the first external circumferential wall part, a suction space formed between the first external circumferential wall part and the second external circumferential wall part, an air nozzle attached to a side of the first external circumferential wall part and suctioning air from the suction space, and a suction surface formed between a lower edge of the second external circumferential wall part and the first external circumferential wall part and positioned higher than a lower end of the jetting part;

wherein an upper end of the suction space is substantially at a same height as the upper surface of the porous member.

3. A stage apparatus, comprising:

a stage;

a first moving body configured to move above the stage in a first direction;

a second moving body configured to move along the first moving body in a second direction perpendicular to the first direction; and a hydrostatic bearing provided at a lower part of at least one of the first moving body and the second moving body, the hydrostatic bearing being configured to slide along a sliding surface of the stage in a non-contact manner, wherein the hydrostatic bearing includes a jetting part having a jetting surface configured to jet air onto the sliding surface, and a suction part having a suction surface configured to suction the air jetted from the jetting surface onto the sliding surface;

wherein the jetting part includes a porous member having holes formed therein, a first external circumferential wall part disposed to contact and surround an external circumferential surface of the porous member to prevent leakage of the air from the external circumferential surface of the porous member, and an upper wall part including a contacting part that is in contact with an edge along an entire circumference of an upper surface of the porous member and forming a space for supplying the air to the porous member;

wherein the suction part includes a second external circumferential wall part surrounding an external circumferential surface of the first external circumferential wall part, a suction space formed between the first external circumferential wall part and the second external circumferential wall part, and a suction surface formed between a lower edge of the second external circumferential wall part and the first external circumferential wall part and positioned higher than a lower end of the jetting part;

wherein the first external circumferential wall part and the second external circumferential wall part are formed as separate parts.

4. A stage apparatus, comprising:

a stage;

a first moving body configured to move above the stage in a first direction;

a second moving body configured to move along the first moving body in a second direction perpendicular to the first direction; and a hydrostatic bearing provided at a lower part of at least one of the first moving body and the second moving body, the hydrostatic bearing being configured to slide along a sliding surface of the stage in a non-contact manner, wherein the hydrostatic bearing includes a jetting part having a jetting surface configured to jet air onto the sliding surface, and a suction part having a suction surface configured to suction the air jetted from the jetting surface onto the sliding surface;

wherein the jetting part includes a porous member having holes formed therein, a first external circumferential wall part disposed to contact and surround an external circumferential surface of the porous member to prevent leakage of the air from the external circumferential surface of the porous member, and an upper wall part including a contacting part that is in contact with an edge along an entire circumference of an upper surface of the porous member and forming a space for supplying the air to the porous member;

wherein the suction part includes a second external circumferential wall part surrounding an external circumferential surface of the first external circumferential wall part, a suction space formed between the first external circumferential wall part and the second external circumferential wall part, an air nozzle attached to a side of the first external circumferential wall part and suctioning air from the suction space, and a suction surface formed between a lower edge of the second external circumferential wall part and the first external circumferential wall part and positioned higher than a lower end of the jetting part;

wherein an upper end of the suction space is substantially at a same height as the upper surface of the porous member.

* * * * *